United States Patent [19]

Ohuchi et al.

[11] Patent Number: 5,282,369
[45] Date of Patent: Feb. 1, 1994

[54] MULTIPLE TYPE ABSORPTION AIR CONDITIONING SYSTEM

[75] Inventors: Tomihisa Ohuchi, Tsukuba; Akira Nishiguchi, Ushiku; Seiichiro Sakaguchi; Daisuke Hisajima, both of Ibaraki; Michihiko Aizawa, Ushiku; Takashi Nakao, Ibaraki; Yasuo Koseki, Hitachiota; Kyoji Kohno, Tokyo, all of Japan

[73] Assignee: Hitachi, Ltd., Tokyo, Japan

[21] Appl. No.: 859,989

[22] Filed: Mar. 30, 1992

[30] Foreign Application Priority Data

Mar. 29, 1991 [JP] Japan .................. 3-093045

[51] Int. Cl.⁵ .................................. F24F 11/00
[52] U.S. Cl. ............................... 62/476; 62/141; 62/324.2; 165/22
[58] Field of Search .......... 62/476, 101, 148, 141, 62/324.2, 103, 104, 105, 106; 237/2 B; 62/103, 104, 105, 106; 165/22

[56] References Cited

U.S. PATENT DOCUMENTS

| | | | |
|---|---|---|---|
| 2,073,110 | 3/1937 | Lawton | 62/148 |
| 3,137,144 | 6/1964 | Kaufman et al. | 62/105 |
| 3,527,061 | 9/1970 | Kruggel | 62/142 |
| 3,874,193 | 4/1975 | Reistad | 62/490 |
| 4,429,541 | 2/1984 | Kamejima et al. | 62/201 |
| 4,665,709 | 5/1987 | Perry | 62/141 |

FOREIGN PATENT DOCUMENTS 263058 12/1985 Japan .

Primary Examiner—Albert J. Makay
Assistant Examiner—William C. Doerrler
Attorney, Agent, or Firm—Antonelli, Terry, Stout & Kraus

[57] ABSTRACT

The capacity control range of an interior unit of a multiple type absorption air conditioning system is increased, and turning on and off of cooling/heating and switch over between the cooling and heating can be readily and safely performed. The capacity control range is increased by reserving a liquid refrigerant in an absorption cool/warm water unit. An interior unit is connected to the absorption cool/warm water unit by a communication device. The operation of the cool/warm water unit caused by turning on and off the system and switch over between cooling and heating are automatically controlled by an operation control device. Consequently, the operation is simplified, and safety is improved.

20 Claims, 11 Drawing Sheets

MULTIPLE TYPE ABSORPTION AIR CONDITIONING SYSTEM

BACKGROUND OF THE INVENTION

1. Field of the Invention

The present invention relates to an air conditioning system which employs an absorption type cool/warm water unit, and more particularly, to a multiple type absorption air conditioning system which can be readily switched over from the cooling operation to the heating operation, and reversely in accordance with individual air conditioning requirement.

2. Description of the Related Art

Japanese Patent Unexamined Publication No. 60-263058 discloses the absorption type cool/warm water unit which can be switched over from the cooling operation to the heating operation, and reversely. A conventional air conditioning system employing such an absorption type cool/warm water unit has a disadvantage in that it requires separate operations of the air conditioners installed in individual rooms in a building and the absorption type cool/warm water unit, which is an outdoor unit. Further the air conditioners and the absorption type cool/warm water unit must be switched on respectively when an air conditioning is desired. Consequently, even when a user in one of the rooms desire an air conditioning and switches on the air conditioner in that room, the room cannot be air conditioned unless the absorption type cool/warm water unit is switched on. Another drawback of the aforementioned conventional air conditioning system is that the air conditioner and the absorption type unit must be operated along the predetermined operation procedures in order to eliminate troubles, such as crystallization of a solution. That is, when the absorption type cool/warm air unit is to be activated for cooling, starting-up of the cooling operation must be postponed until a difference in the concentrations of the solutions is generated. Also, when the absorption type cool/warm air unit is to be stopped, stoppage of the operation thereof must be postponed until the concentrated solution is diluted in order to prevent the solution from being crystallized due to cooling by natural heat radiation. If the cool/warm water unit is activated or stopped in a state in which no heat load is applied thereto from an air conditioner or a fan coil unit, the solution crystallization or disability of the diluting operation may occur. Hence, regardless of the request of a load, part or all of the air conditioners or fan coil units must be operated to circulate the cool/warm water before the absorption type cool/warm water unit is operated. However, this operation is so complicated that the ordinary user cannot do that. Furthermore, switch over of the cooling and the heating operations requires switching over of the operations of the absorption type cool/warm water unit. That is, switch over of the cooling/heating operations requires switching over of the refrigerant cycle and draining of a cooling water from an absorber and a heat exchanger of a condenser, which cannot be done by the ordinary user as well. Furthermore, since part or all of the air conditioners or fan coil units are operated to circulate the cool/warm water before the operation of the absorption type cool/warm water unit is started regardless of the request of the load, energy is wasted in terms of the ventilation activating power and cool/warm water circulating power.

SUMMARY OF THE INVENTION

An object of the present invention is to provide a multiple type absorption air conditioning system which can be easily operated for air conditioning in order to meet the request of air conditioning or of switch over between the cooling and heating which are made by the users from a plurality of rooms.

Further, another object of the present invention is to provide a multiple type absorption air conditioning system which automatically performs prevention of crystallization during the cooling operation and control of the flow rate of a cool/warm water so as to eliminate the cooling a room from which no request of a load is made, thereby preventing a waste of energy.

The present invention provides a multiple type absorption air conditioning system which comprises: an absorption cool/warm water unit in which a weak solution diluted by a refrigerant is heated in a regenerator so as to generate refrigerant steam, in which the refrigerant steam is cooled and condensed by a cooling means and is then evaporated in an evaporator to cool a cool/warm water during a cooling operation or the refrigerant steam heats the cool/warm water in the evaporator during a heating operation, in which the refrigerant which has cooled or heated the cool/warm water in the evaporator is absorbed in or mixed with in an absorber a strong solution produced when the refrigerant steam is generated so as to obtain the weak solution, and the weak solution is returned to the regenerator; a cool/warm water system for introducing the cool/warm water cooled or heated by the absorption cool/warm water unit; a plurality of water/air heat exchanging means for cooling or heating air by the cool/warm water from the cool/warm water system; and an air system for blowing the air cooled or heated by the water air heat exchanging means into individual rooms.

The present invention further provides a multiple type absorption air conditioning system which comprises: an absorption cool/warm water unit in which a weak solution diluted by a refrigerant is heated in a regenerator so as to generate refrigerant steam, in which the refrigerant steam is cooled and condensed by a cooling means and is then evaporated in an evaporator to cool a cool/warm water during a cooling operation or the refrigerant steam heats the cool/warm water in the evaporator during a heating operation, in which the refrigerant which has cooled or heated the cool/warm water in the evaporator is absorbed in or mixed with in an absorber strong solution produced when the refrigerant steam is generated so as to obtain the weak solution, and the weak solution is returned to the regenerator; a cool/warm water system for introducing the cool/warm water cooled or heated by the absorption cool/warm water unit; a plurality of water/air heat exchanging means for cooling or heating air by the cool/warm water from the cool/warm water system; and an air system for blowing the air cooled or heated by the water air heat exchanging means into individual rooms, wherein further including means for controlling an operation and a stoppage of the absorption cool/warm water unit in a cooling or heating operation mode, and a switch over of the two operation modes by controlling pumps and valves of the absorption cool/warm water unit and of the cool/warm water system, a controller provided in each of the water air heat exchanging means, the controller having a function of operating and stopping the operation of the absorption cool/- warm water unit and a selecting the operation mode of the absorption cool/warm water unit, and means for transmitting an operation signal from the controller to the operation control means so as to allow the absorption cool/warm water unit to be controlled by the operation of the controller.

The cool/warm water system of the air conditioning system according to the present invention includes a main cool/warm water pipe which comes from the absorption cool/warm water unit, a plurality of sub cool/warm water pipes which lead to a plurality of water air heat exchanging means, and branch pipes for connecting the main cool/warm water pipe to the sub cool/warm water pipes.

In the present invention, since the absorption cool/warm water unit employs a liquid refrigerant, even when heat input is temporarily stopped when a load is varied, a cooling operation can be continued with the residual cooling capacity. It is therefore possible to freely switch over the load. Furthermore, the components of an exterior unit when the system is activated or when cooling and heating are switched over are automatically operated by an operation control device, and the operations of the operation control device can be controlled from a controller provided at each of the air outlets and connected to the operation control device via a signal line. Consequently, disability of the operation or crystallization of the solution can be eliminated, and the cooling/heating operation can be provided by a safe and easy operation conducted in each of the rooms. Furthermore, a multiple type air conditioning system can be provided in terms of the structure by providing branching pipes.

DESCRIPTION OF THE PREFERRED EMBODIMENTS

Figure 1:
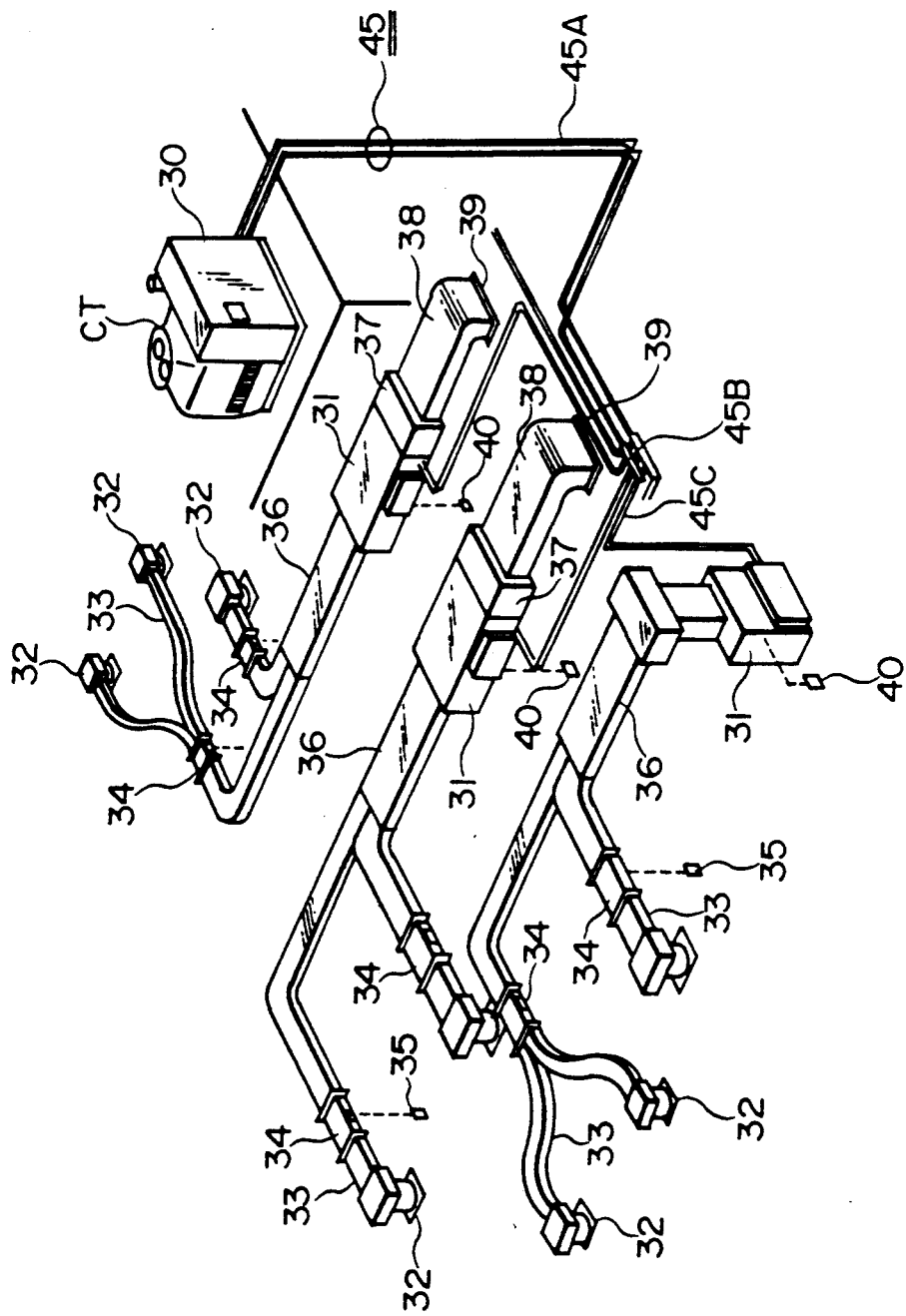
FIG. 1 is a schematic perspective view of a system according to the present invention.

As shown in FIG. 1, a multiple type absorption air conditioning system according to one embodiment of the present invention includes an outdoor unit or an absorption type cool/warm water unit 30, interior units 31 for blowing out the air taken from air inlets 39 through ducts 38 and filters 37, temperature of which is adjusted by the cool/warm water coming from the absorption type cool/warm water unit 30 through a cool/warm water pipe arrangement 45, and air rate control units (VAV units) 34 for controlling a flow rate of the air from the interior units 31 through ducts 36 and for sending it to ducts 33 and air outlets 32. Each of the interior units 31 is controlled by the respective controller 40 provided therein. The flow rate of each of the VAV units 34 is adjusted by controlling the opening degree of a damper (not shown) according to the output of a room thermostat 35.

The cool/warm water pipe arrangement 45 includes a main pipe 45A coming from the absorption cool/warm water unit 30, a plurality of sub-pipes 45C leading to the interior units 31, and branch pipes 45B connecting the main pipe 45A to the plurality of sub-pipes 45C and distributing the cool/warm water. The cool/warm water coming from the single absorption type cool/warm water unit 30 is distributed to the individual interior units 31, thereby completing a multiple air conditioning system. Each of the interior units 31 has the water/air heat exchanging function. This is achieved by disposing the sub-pipe 45C in the interior of the duct 38 (or in the pipe of the interior unit 31) so as to transmit the heat of the cool/warm water in the sub-pipe 45c to the air in the duct 38. As shown in FIG. 1, the pipe arrangement 45 is a circulation pipe arrangement.

The interior unit 31, which is provided on each of the floors, is connected through the duct 36 to the individual ducts 33 which are provided in the respective rooms in the floor.

Figure 2:
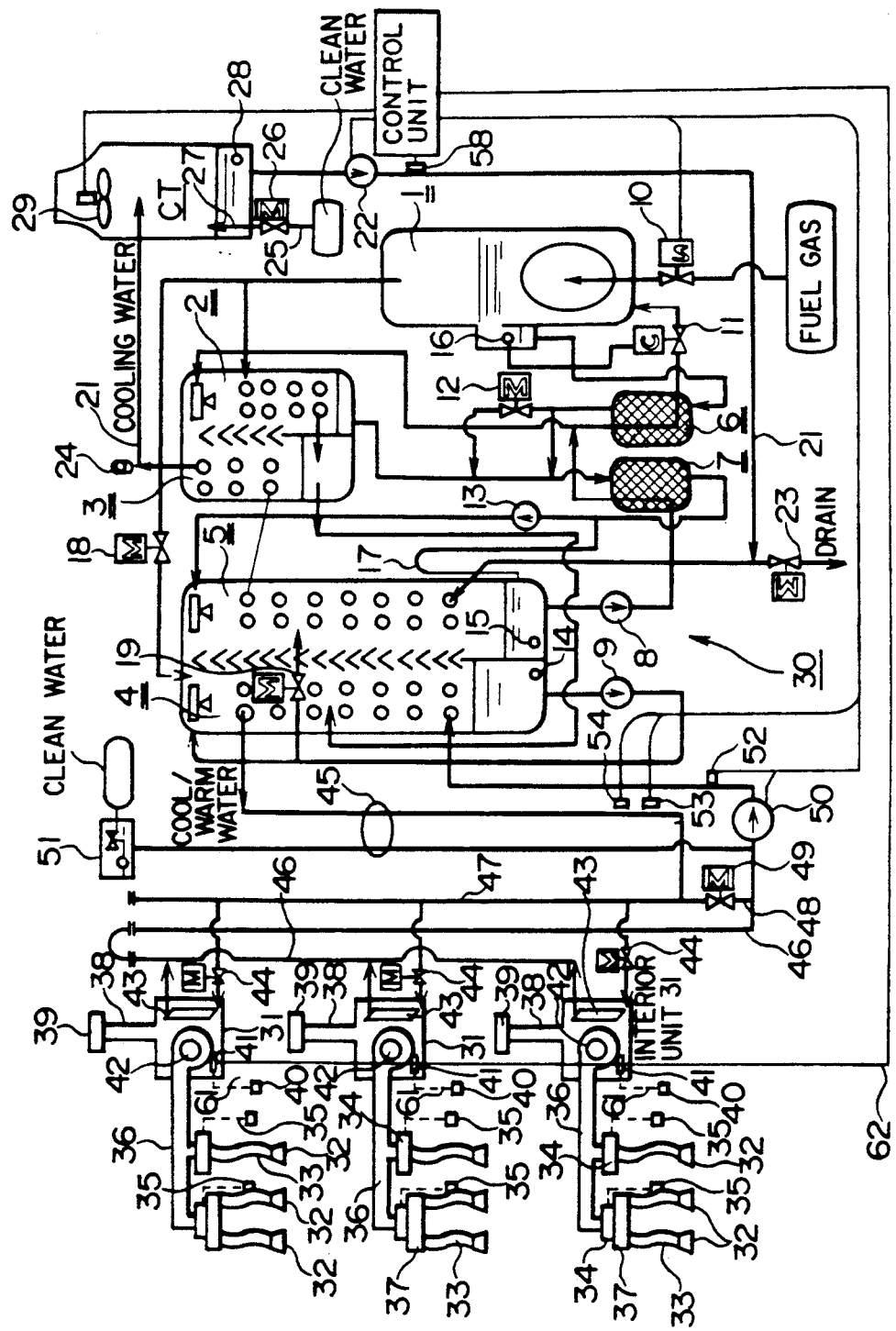
FIG. 2 is a schematic view of a piping arrangement of the system shown in FIG. 1.

Referring to FIG. 2, the absorption type cool/warm water unit 30 includes a high-temperature regenerator 1 for heating absorbed solution by an external heat source to generate refrigerant steam, a low-temperature regenerator 2, a condenser 3 for cooling the generated refrigerant steam by a cooling water to condense it, an evaporator 4 for evaporating the liquid refrigerant by spraying it and for cooling the water by utilizing the latent heat of evaporation, an absorber 5 for making the evaporated refrigerant steam absorbed in a solution while cooling the refrigerant steam, a high-temperature heat exchanger 6 for performing heat exchange between a strong solution and a weak solution, a low-temperature heat exchanger 7, a pump 9 for circulating solution and a pump 13 for spraying solution. The absorption type cool/warm water unit 30 further includes a cooling/heating switch-over valve 18 for allowing the high-temperature refrigerant steam to flow from the high-temperature regenerator I into the evaporator 4 to heat the warm water flowing in the pipe, in the heating operation, and a liquid refrigerant feed control valve 19 for sending out the liquid refrigerant condensed in the evaporator to the solution system. These valves 18 and 19 are operatively connected. A heat source input control device 10 is provided. Although not shown, an automatic bleeding system (APU) and a reservoir tank ST for reserving gas therefor are also provided. In the cooling operation, particularly, in the cooling operation switched over from the heating operation, the bleeding system is operated to remove various types of substances which prohibit absorption. Also, a cooling water pipe system is provided, which includes a cooling water pipe 21 through which a cooling water is supplied into heat-transfer pipes of the absorber 5 and of the condenser 3, a cooling tower CT having a fan 29, and a pump 22 for pumping cooling water. In the cooling water pipe system, there are provided a motor driven drain valve 23, an automatic air vent valve 24, a make-up water pipe 25, a motor driven make-up water supply control valve 26, a float valve 27 and a liquid level switch 28. Three to fifteen interior units 31 are provided, with each of the interior units 31 including a blower fan 42 and a heat exchanging coil 43 through which the cool/warm water flows. The cool/warm water from the evaporator 4 is fed to each of the interior units 31 via a cool/warm water pipe 45 and an feed forward pipe 47, and back through a return pipe 46, a cool/warm water pump 50 and the cool/warm pipe 45. A part of the cool/warm water flows back to the evaporator 4 through a cool/warm water bypass pipe 48 which is controlled by a bypass flow rate control valve 49. An inlet of the pump 50 is connected to a pipe coming from a cistern 51. A cool/warm water flow rate control valve 44 controls the flow rate of the cool/warm water flowing into the interior unit 31.

Figure 3:
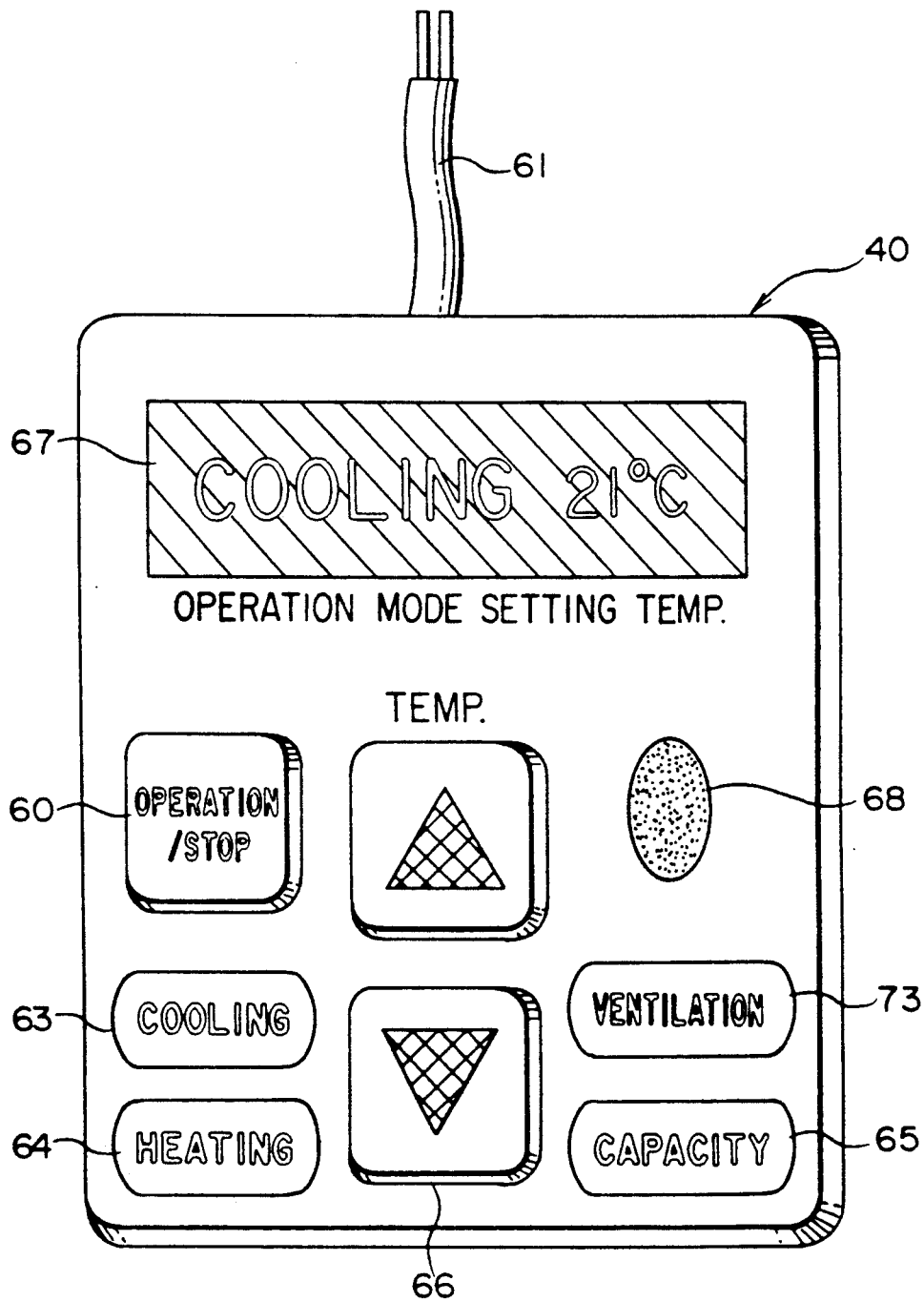
FIG. 3 is a view of a controller of an interior unit.

As shown in FIG. 3, the controller 40 is provided with an operation switch 60, a cooling operation selection switch 63, a heating operation selection switch 64, a flow rate setting switch 65, a room temperature setting switch 66, an operating state display panel 67 and a speaker 68. The controller 40 is connected to an interior unit operation control panel 41 via a cross over 61 (FIG. 2).

As shown in FIG. 2, an operation control device 20 is connected to the control panel 41 of the respective interior unit via a signal transmission line 62. When the switches of any one of the controllers 40 are operated, the operation control device 20 receives operation signals from the controller 40 through the corresponding control panel 41. The operation control device 20 also receives signals from various types of detectors, and performs control of the absorption type cool/warm water unit 30 and various valves according to the operation signals and the signals from the detectors. In order to accomplish such an operation, the operation control device 20 is constructed by, for example, a microprocessor and programs for various operations. First, normal cooling operation will be explained. In the controllers 40 of all the interior units 31, the cooling operation selection switch 63 is activated, the flow rate capacity setting switch 65 and the room temperature setting switch 66 are operated to set desired flow rate and temperature. The operation switch 60 is turned on. The signals representing the operator's demands are sent to the operation control device 20 through the interior unit operation panels 41 via the cross over 61 and signal transmission line 62. The cooling/heating switch-over valve 18 of the absorption type cool/warm water unit 30 is closed, and the liquid refrigerant feed control valve 19 is also closed. In that state, the absorption refrigerating cycle operates in the manner described below.

In the high-temperature regenerator 1, an absorption solution is heated by combustion heat of city gas or kerosene to generate refrigerant steam and thereby concentrate the solution. The refrigerant steam generated in the high-temperature regenerator 1 heats the solution in the low-temperature regenerator 2 to generate refrigerant steam and thereby further concentrate the solution. The refrigerant steam generated in the low-temperature regenerator 2 and the refrigerant in the high-temperature regenerator 1 are led to the condenser 3 where they are cooled by a cooling water and thereby condensed and liquefied. The condensed liquid refrigerant is sent to the evaporator 4. The evaporator 4 evaporates the liquid refrigerant by spraying to cool the cool/warm water flowing the pipes by evaporation latent heat. A part of the strong solution concentrated in the high-temperature regenerator 1 flows through the high-temperature heat exchanger 6 to be mixed with the strong solution from the low-temperature regenerator 2 and further flows into the low-temperature heat exchanger 7. The strong solution from the low-temperature heat exchanger 7 is sprayed above the pipes in the absorber 5 by means of the solution spray pump 13. In the absorber 5, the sprayed strong solution is cooled by the cooling water flowing through the pipes, while the refrigerant steam from the evaporator 4 is absorbed into the strong solution to produce a low-temperature weak solution. The weak solution is fed to the low-temperature heat exchanger 7 by the solution circulating pump 8, where heat exchange is performed between the strong solution and the weak solution. Behind the low-temperature heat exchanger 7, the solution is divided into two portions, with one portion being fed to the low-temperature regenerator 2 and the other portion being fed to the high-temperature regenerator 1 through the high-temperature heat exchanger 6 and the solution circulation flow rate control valve 11. The absorption refrigerating cycle is completed. Lithium bromide aqueous solution is used as the solution, while water is used as the refrigerant. In the absorber 5 and the condenser 3, since the gaseous refrigerant is liquefied, if a non-condensed gas is present, the heat-substance moving performance deteriorates. Hence, the non-condensed gas is extracted from the absorber 5 and condenser 3 by the automatic bleeding system APU (not shown), and the extracted gas is reserved in the reservoir tank ST (not shown). The automatic bleeding system APU and the reservoir tank ST always operate during the cooling operation.

The water in the cooling tower CT is circulated by means of the cooling water pump 22. While the cooling water from the cooling tower CT flows through the heat-transfer pipes of the absorber 5 into the heat-transfer pipes of the condenser 3, heat exchange is performed. The cooling water returns to the cooling tower CT to be sprayed. Air is fed into the cooling tower by the fan 29 to evaporate a part of the cooling water and thereby cool the water. A clean water is supplied into the cooling tower through the water supply pipe 25, the control valve 26 and the float valve 27 to make up the loss due to evaporation, blowing conducted to prevent concentration of the solid contents, and scatter. To prevent idling of the cooling water pump, the liquid level switch 28 is provided. When it is detected by a cooling water temperature sensor 58 that the temperature of the cooling water is lower than a predetermined value, the operation control device 20 stops the fan 29, thereby preventing further reduction in the temperature of the cooling water. In this manner; the absorption cooling operation can be allowed in a wide range of the atmospheric conditions.

In the cool/warm water system, the cistern 51 is provided to allow the cool/warm water to be present in the pipe arrangement under an adequate pressure. The cool/warm water is led to the group of heat-transfer pipes of the evaporator 4 through the cool/warm water pipe 45 by means of the pump 50. In the evaporator 4, the cool/warm water is cooled by virtue of the aforementioned evaporation latent heat of the liquid refrigerant. The cool/warm water thus cooled is fed through the feed forward pipe 47 to the individual interior units 31. In the interior unit 31, the cooled cool/warm water is led to the heat exchange coil 43 via the cool/warm water flow rate control valve 44, where heat exchange is performed between the cooled cool/warm water and the air. The cool/warm water from the heat exchange coils 43 is collected together to flow through the return cool/warm water pipe 46 and then returned to the cool/warm water pump 50 to complete a circulation. In order to supply the cool/warm water having a substantially constant temperature to each of the interior units 31, the operation control device 20 performs outlet temperature control and inlet temperature control. The outlet temperature control is conducted by closing the heat input control valve 10 when the temperature detected by the feed forward cool/warm water temperature detector 53 provided at the outlet of the evaporator 4 is equal to or lower than a predetermined value. The inlet temperature control is conducted by closing the heat input control valve 10 when the temperature indicated by the return cool/warm water temperature detector 52 is equal to or lower than the predetermined value. The operation control device 20 also controls the bypass flow rate control valve 49 to adjust the bypass flow rate such that the bypass flow rate detected by the cool/warm water flow rate detector 54 provided in the cool/warm water pipe 45 becomes equal to a predetermined value when the cool/water water flow rate control valve 44 is closed. In the above-mentioned arrangement, the flow rate of the cool/warm water in the evaporator 4 can be increased, thus increasing the heat transfer coefficient and, hence, the heat exchange efficiency. Furthermore, since the cool/warm water can be distributed only to the interior units 31 whose operations are necessary, energy conservation can be attained.

The outdoor air or the air in the room is suctioned from the air inlet 39 through the filter, and then led to the heat exchange coil 43 of the interior unit 31 through the duct 38. In the heat exchange coil 43, the air is cooled as well as a part of the water contents in the air is condensed into a drain. The drain is gathered in a drain receiver and is then discharged to the outside of a building via a drain pipe (not shown). The cooled air is fed through the duct 36, the (VAV) unit 34 and the duct 33 by means of the blower fan 42 and is then supplied from the outlet 32 into the room to cool it. The temperature of the air in a room is detected by the room thermostat 35. When the temperature in the room is higher than a preset-value, the flow rate is increased by opening the VAV unit 34. That is, when the VAV unit 34 is opened, the cool air flows therethrough more easily, and the pressure detected by an air pressure detector 74 (not shown) provided in the duct 36 is thus reduced. Therefore, the rotational speed of the blower fan 42 is increased in order to compensate for the reduced pressure. The rotational speed of the fan 42 is varied by motor speed control due to the frequency conversion by an inverter. This control of the rotational speed is advantageous in terms of the reduction in the noise level and energy conservation. Furthermore, since the temperature of the indoor air is controlled for each room by the room thermostat 35, comfortable air conditioning is available for each room. Furthermore, provision of the suction duct 38 and blower duct 36 enables the interior unit 31 to be disposed at the ceiling of a corridor, and thus eliminates provision of a machine room. Furthermore, since the outdoor air can be taken in from the intermediate portion of the suction duct 38 through a filter and a shutter operated by a ventilation operation switch 73 (shown in FIG. 6), the air conditioning quality can be improved. In that case, the outdoor air can be automatically taken in by providing a carbon oxide concentration detector or an oxygen concentration detector to control the opening and closing of the shutter.

The case in which the user gives an instruction to stop the cooling operation to the controller 40 of one interior unit 31 in the cooling operation will be described below. In that case, the operation control panel 41 of the associated interior unit 31 stops the fan 42 and closes the cool/warm water flow rate control valve 44 to stop supply of the cool/warm water to the heat exchange coil 43. Consequently, the user can feel at once that the cooling operation has stopped, and isn't irritated. Also, heat loss due to natural convection can be reduced, and energy conservation can thus be accomplished. The operation control device 20 closes the heat input control valve 10 of the absorption cool/warm water unit 30 and thereby temporarily stops heating the high-temperature regenerator 1. The heating of the high-temperature regenerator 1 is returned to its normal mode after a predetermined period of time has elapsed. In this way, rapid reduction in the temperature of the cool water, which would occur when the relatively large load of the interior unit is rapidly eliminated, can be prevented. That is, stoppage of the operation of one interior unit 31 indicates that there is the possibility that the operations of the other interior units 31 are to be stopped. In case that the interior units 31 receive the instruction of stopping operation in sequence, the temperature of the cool/warm water reduces. Since feeding of the strong solution in the high-temperature regenerator 1 and the low-temperature regenerator 2 into the absorber 5 is delayed, heat input conducted in that state causes reduction in the temperature of the cool/warm water and refrigerant in the evaporator 4 whose heat load has been reduced, thus increasing the possibility of crystallization and, hence, the safety operation may be conducted. The safety operation against the reduction in the temperature of the cool/warm water or refrigerant is to stop the heat input and the solution spraying pump 13 or to open the liquid refrigerant feed control valve 19. Such safety operation results in a loss of the accumulated heat energy. Thus, temporary stoppage of heating eliminates the safety operation and thus allows for an energy conservation operation.

When all the interior units 31 receive the instruction for stopping the cooling operation, the operation control device 20 first closes the heat source control valve 10 of the absorption cool/warm water unit 30 to stop heat input and then opens the refrigerant feed control valve 19 and the solution bypass valve 12 to blow the liquid refrigerant in the evaporator 4 and to increase the amount of solution circulated to dilute the solution. When it is detected by the refrigerant level switch 14 that the liquid refrigerant in the evaporator 4 has reduced to a predetermined level and when the temperature or pressure of the refrigerant detected by a detector (not shown) in the absorption cool/warm water unit 30 has thus reached the predetermined value, the control device 20 and the individual control panels 41 in combination close the refrigerant feed control valve 19 and the solution bypass valve 12. Further they stop the fans 42 and close the cool/warm water unit flow rate control valves 44 of the individual interior units 31. After the bypass flow rate control valve 49 is opened and then the flow rate can be controlled, the refrigerant pump 9, the cool/warm water pump 50, the cooling water pump 22, the solution circulating pump 8 and the solution spraying pump 13 are stopped. Thus, in the case when all the interior units are to be stopped a stopping of each of the interior units 31 is delayed while a load is being applied to the interior unit so as to dilute the solution uniformly. Thus, the controller 40 of the interior unit 31 can control not only the operation of the interior unit 31 but also the operations of the absorption cool/warm water unit 30, the cooling tower CT, the cooling water pump 22 and the cool/warm water pump 50. Special operation is thus not necessary.

When the operation signal is inputted from the controller 40 of any one interior unit 31, the operation control device 20 operates the cooling water pump 22, the cool/warm water pump 50 and the fan 29 of the cooling tower CT. Also, the corresponding control panel 41 opens the cool/warm water flow rate control valve 44 of the corresponding interior unit 31 and operates the fan 42 to blow air into the room. At that time, it is checked by the cooling water temperature sensor 58 whether the temperature of the cooling water is within the predetermined range. It is also checked by the feed forward cool/warm water temperature detector 53 or the return cool/warm water temperature detector 52 whether the temperature and the flow rate of the cool/warm water are predetermined values. When the temperature of the cooling water is low, the fan 29 is stopped. If the temperature of the cooling water doesn't become higher than a predetermined value after the fan 29 has been stopped, disability of the operation is displayed and the system doesn't work. The system is not operated either when the flow rate of the cool/warm water is lower than a predetermined value. When the above-mentioned conditions are satisfied, the solution circulating pump 8, the refrigerant pump 9 and the solution spraying pump 13 are operated, and the heat input control valve 10 is opened to heat the high-temperature regenerator 1. When the temperature of the cooling water is low, the solution bypass valve 12 is opened so as to allow the liquid refrigerant to be easily circulated in the high-temperature regenerator 1. Thus, the cooling operation is activated by the user's operation instruction alone.

The activation of the cooling operation, the normal operation of the cooling operation and the operation of the system when part or all of the interior units are stopped have been described. In either case, the cooling operation can be performed or stopped safely and efficiently by the user's operation conducted in the room.

When the user turns on the heating selecting switch 64 and the operation switch 60 of the controller 40 (FIG. 3) of one interior unit 31, the following three cases are possible: (1) the system is in a cooling operation, (2) the system is in a stop in a cooling operation, and (3) the system is switched over to a heating operation. In the case (1), the controller 40 informs the user of disability of switching over acoustically from the speaker 68 using synthetic voice or usually from the operation mode display panel 67. Case (3) is the normal heating operation and will be described later. Case (2) is a case when the system can be switched over to the heating operation. The switching over operation of case (2) will be conducted in the manner described below.

At that time, the user presses the heating selecting switch 64 on the controller 40 of that interior unit 31 a plurality of times within a predetermined period of time. The signals representing a plurality of presses are inputted to the operation control device 20. The operation control device 20 displays the heating operation in the controllers 40 of the individual interior units 31.

Next, the operation control device 20 operates the cool/warm water pump 50, the solution circulating pump 8 and the refrigerant pump 9, and opens the heat source control valve 10 to heat the high-temperature regenerator 1. Also, the cooling/heating switch-over valve 18 and the refrigerant feed control valve 19 are opened so as to allow the liquid refrigerant to be mixed with the solution and so as to allow the steam generated in the high-temperature regenerator 1 to flow through the switch-over valve 18 into the evaporator 4. In the evaporator a heat exchange is conducted between the steam and the cool/warm water flowing through the pipes therein and the steam is condensed. The liquefied refrigerant is fed to the solution in the absorber 5 by the refrigerant pump 9. During that time, the motor-operated drain valve 23 is opened while the motor-operated water supply valve 25 is closed. The temperature of the cool/warm water is detected by the detector 52 or 53. When the cool/warm water temperature exceeds a predetermined value, the control panel 41 operates the blower fan 42 of the interior unit 31. The air from through the suction inlet 39 and the duct 38 is heated by the heat exchange coil 43, and then supplied into the room for heating, through the filter 37, the duct 36, the VAV unit 34, the duct 33 and the outlet 32. The air flow rate is varied according to a result of the comparison between the room thermostat 35 and the setting temperature set by the switch 66. Thus, the user can comfortably switch over the operation of the air conditioning system from the cooling operation to the heating operation only by the operation of the controller 40.

In case (3), that is, when the system is in the heating operation, the cooling/heating switch-over valve 18 and the refrigerant feed valve 19 are opened, and draining of the cooling water system has been completed. Therefore, when the operation instruction is given, the cool/warm water pump 50, the solution circulating pump 8 and the refrigerant pump 9 are operated at once, the heat source control valve 10 is opened to heat the high-temperature regenerator 1. Thereafter, the same operation as that mentioned above is conducted to provide a heating operation.

The operation when the operation mode is switched over from the heating operation to the cooling operation will be described below. When a cooling signal is output from the controller 40 of one interior unit 31, the following three case are possible: (4) the system is in a heating operation, (5) the system is in a stop in a heating operation, and (6) the system is switched over to the cooling operation. In the case of (4), the controller 40 informs the user of disability of switch over. The case (6) is the normal cooling operation and then the aforementioned operation is conducted. The case (5) is a case when the system can be switched over from the heating operation to the cooling operation. In that case, when the cooling selecting switch 63 of the controller 40 of the interior unit 31 is turned on, that the interior unit 31 is set to the cooling operation mode, however, the remaining interior units 31 are in the heating operation. Hence, similar to the case where the operation is switched over from the cooling operation to the heating operation, the user presses the cooling selecting switch 3 a plurality of times within a predetermined period of time. The signals representing a plurality of presses are inputted to the operation control device 20. The operation control device 20 displays the cooling operation in the controllers 40 of the interior units 31. When all the interior units have been set in the cooling operation, the operation control device 20 closes the motor-operated drain valve 23 and opens the motor-operated water supply control valve to supply water to the cooling tower CT through the float valve 27. When the water in the cooling tower CT is increased enough to reach a predetermined level to activate the liquid level switch 28, the cooling water pump 22 is operated, and the cooling/heating switch-over valve 18 and the refrigerant feed control valve 19 are switched over to the cooling operation, on closed. Thereafter, the cool/warm water pump 50 and the absorption cool/warm water unit 30 are initiated in sequence, while the non-condensed gas in the system is exhausted from the reservoir tank ST of the automatic bleeding system APU by a cool water drive aspirator via a cut-off valve, an electromagnetic valve and a check valve. Thus, the cooling operation which has been described first in this embodiment can be initiated only by the user's operation of the controller, and the safe operation which is free from freezing of the cool water can thus be performed effectively without the operation of an expert operator.

In the embodiment of FIG. 1, since the reverse return type pipe arrangement is employed in connection with the cool/warm water pipes 46 and 47 in the interior units 31, the pressure loss in the cool/warm water circulating system is made uniform. Therefrom, generation of vibrations or noises caused by circulation of a large amount of cool/warm water in the heat exchange coil 43 of the specific interior unit 31 or erosion of the heat exchange coil 43 caused by after flowing at a high speed can be eliminated.

Figure 4:
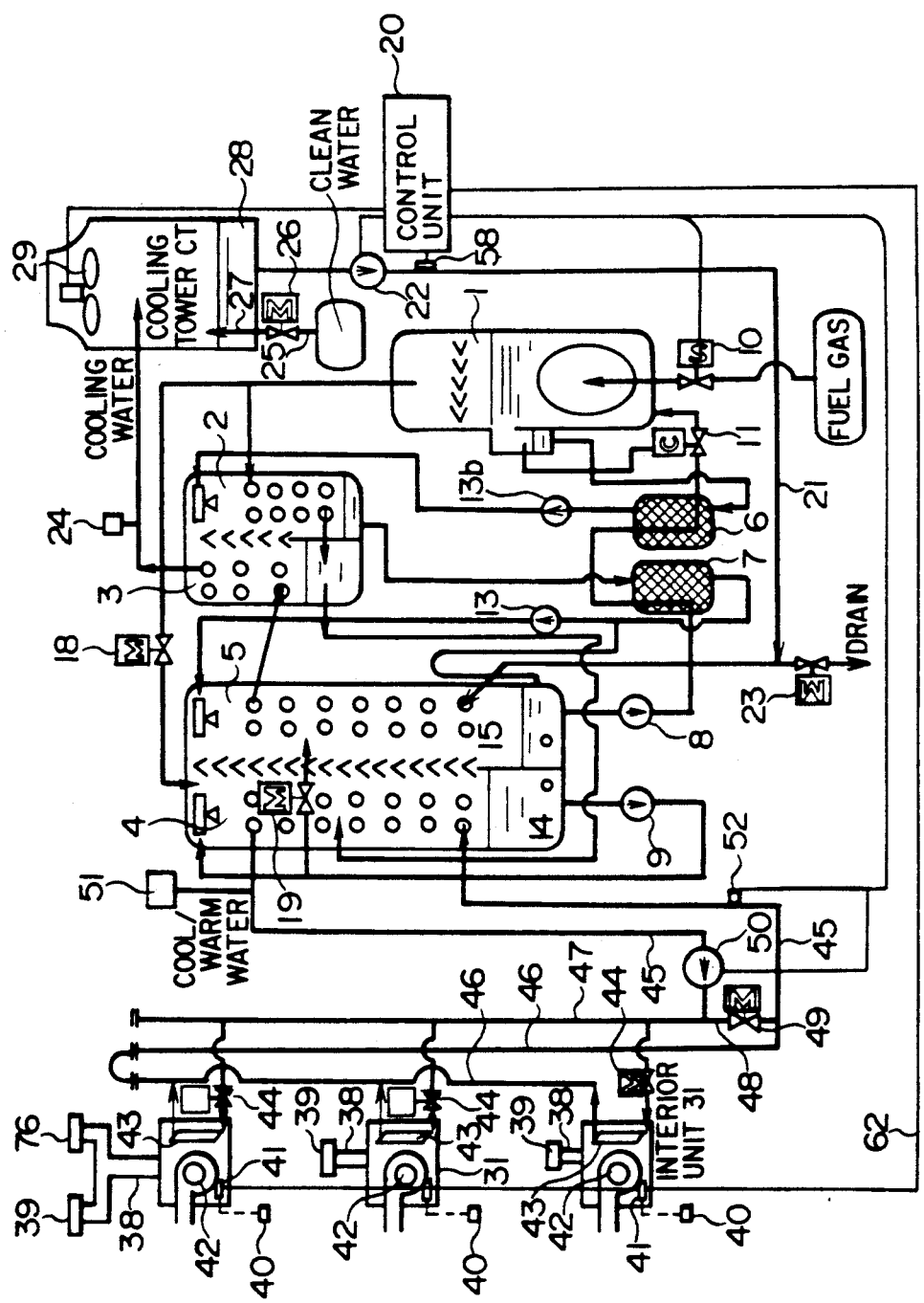
FIG. 4 is a schematic view of a second embodiment of the present invention.

Another embodiment shown in FIG. 4 differs from that shown in FIG. 1 in the following points. Namely, the entire amount of the weak solution generated by the absorber 5 is fed through the low-temperature heat exchanger 6 to the high-temperature heat exchanger 6. The weak solution is fed through the solution circulating rate control valve 11 to the high-temperature regenerator 1. After heat exchange is conducted in the high-temperature heat exchanger 6 between the strong solution generated in the high-temperature regenerator 1 and the weak solution, the strong solution is fed to the low-temperature regenerator 2 by a solution pump 13b where it is further concentrated. The strong solution is returned through the low-temperature heat exchanger 7 to the absorber 5 by the solution spraying pump 13 thereby completing the solution circulation. Further, the difference resides in that the cool/warm pump 50 is disposed at a position which is beyond the evaporator 4 of the absorption cool/warm water unit 30. According this, a provision of the solution bypass valve 12 can be eliminated, and the rotational speed of the solution spraying pump 13 and solution pump 13b can be controlled by an inverter due to a change in the solution circulating route. This enables the flow rate of the circulating solution to be controlled according to the operations. The air system of the embodiment shown in FIG. 4 is the same as that shown in FIG. 1, illustration thereof is partially omitted.

Figure 5:
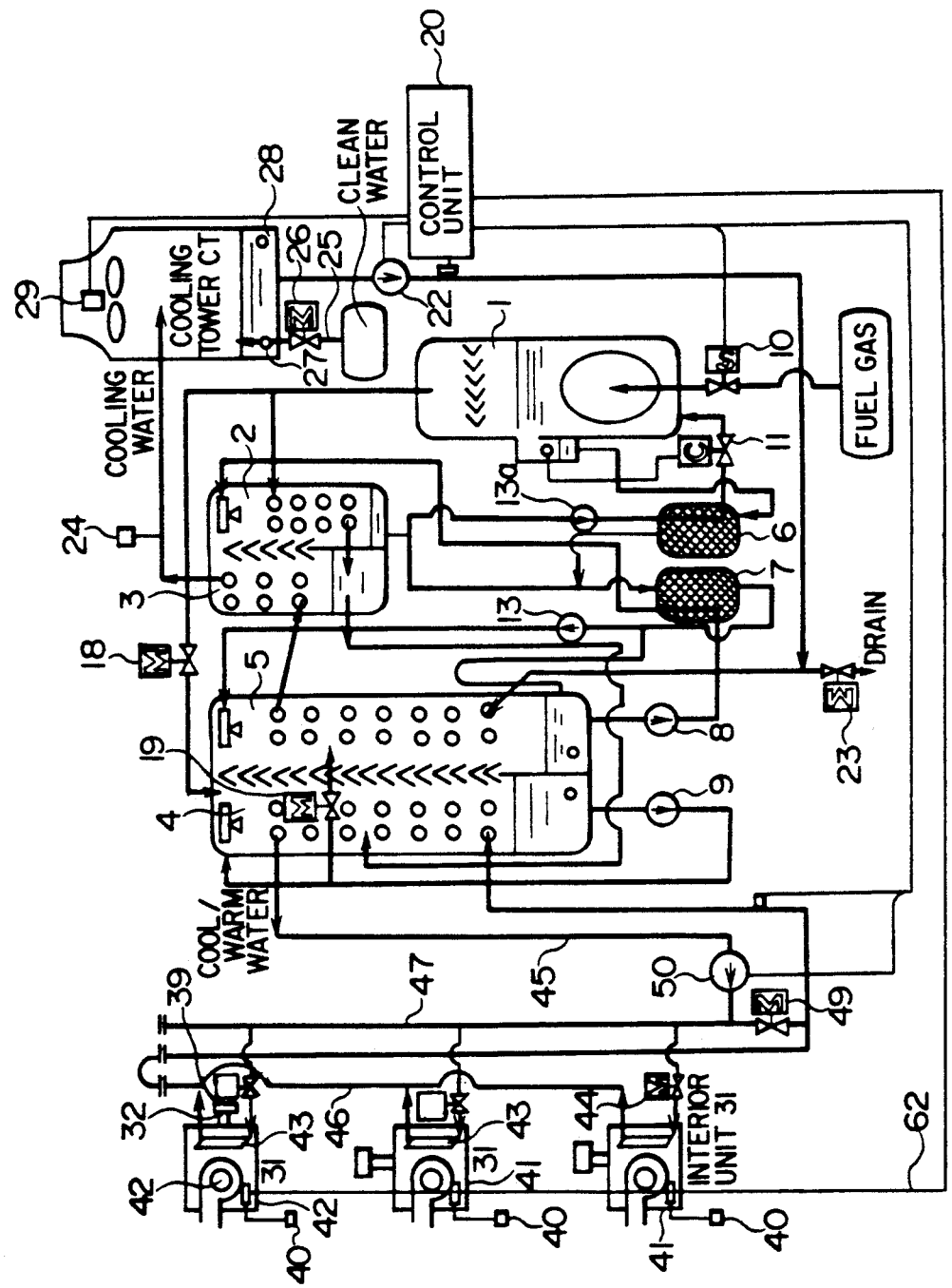
FIG. 5 is a schematic view of a third embodiment of the present invention.

The embodiment shown in FIG. 5 differs from that shown in FIG. 4 in the following point. Namely, the entire amount of the weak solution generated in the absorber 5 is fed through the low-temperature heat exchanger 7 to the low-temperature regenerator 2 and is heated to be condensed. A part of the condensed solution is fed through the high-temperature heat exchanger 6 and the control valve 11 to the high-temperature regenerator 1 by means of the pump 13a. After a heat exchange is conducted in the high-temperature heat exchanger 6 between the strong solution generated in the high-temperature regenerator 1 and the weak solution, the solution is returned to the absorber 5 through the low-temperature heat exchanger 7 by the solution spraying pump 13. According this, the cooling operation can be performed under a low pressure. The air system of the embodiment shown in FIG. 5 is the same as that shown in FIG. 1, illustration is partially omitted.

Figure 6:
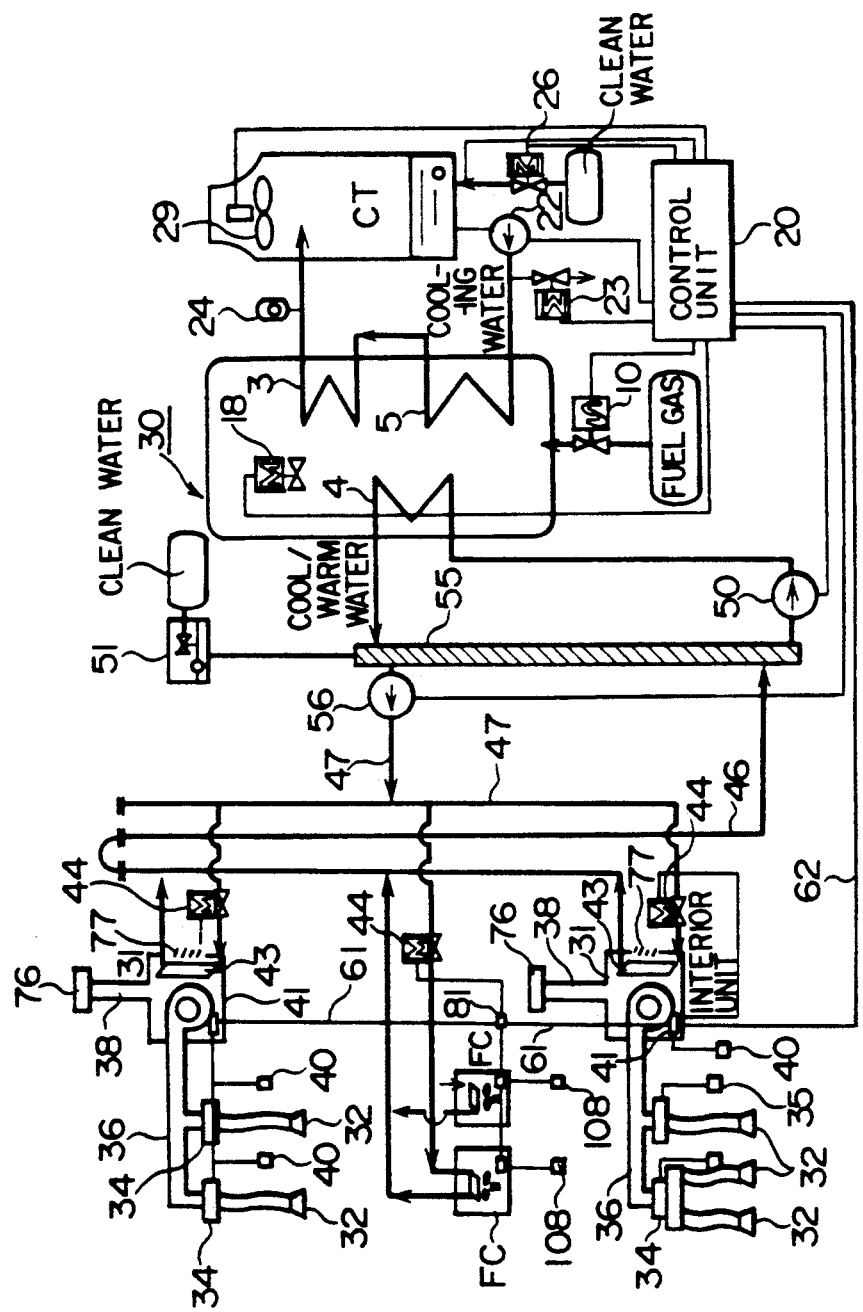
FIG. 6 is a schematic view of a fourth embodiment of the present invention.

The embodiment of FIG. 6 employs an absorption cool/warm water unit 30 which is the same as that shown in FIG. 1, the illustration thereof is simplified. The embodiment of FIG. 6 differs from the embodiment shown in FIG. 1 in the following point. Namely, a buffer tank 55 for the cool/warm water is provided while the cool/warm water pipe 45 constitutes a circulation passage which connects the evaporator 4 of the absorption cool/warm water unit 30, the buffer tank 55 and the cool/warm water pump 50. Furthermore, in the vicinity of the portion of the buffer tank 55 in which the cool/warm water cooled by the evaporator 4 flows, a secondary cool/warm water pump 56 is provided. The heat exchanging coils 43 of the plurality of interior units 31 and the flow rate control valves 44 are connected to the feed forward cool/warm water pipe 47 which is, in turn, connected to the discharge side of the pump 56. The return cool/warm water pipe 46 is connected to the portion of the buffer tank 55, which portion is close to the cool/warm water pump 50. In this arrangement, the cool/warm water bypass flow rate control valve 49 can be eliminated. Instead, the secondary cool/warm water pump 56 can be controlled by an inverter so as to change the rotational speed thereof and thereby control the flow rate of the cool/warm water. Consequently, energy conservation is achieved. Furthermore, since a constant amount of cool/warm water can be circulated in the absorption cool/warm water unit 30 by the cool/warm water pump 50, it is possible to obtain a heat load by detecting the temperatures of the cool/warm water at the inlet and the outlet. This allows for PID control in which the objective value of the temperature of the cool/warm water is set and in which the heat input is controlled on the basis of the objective value and an actual temperature, and therefore makes the control easy. Furthermore, since the buffer tank 55 reduces fluctuations in the temperature of the cool/warm water caused by stoppage of the plurality of interior units 31 and fan coil units FC, the control range can be enlarged and comfortable cooling/heating can be offered.

In this embodiment, three types of layout of the interior units 31 and fan coil units FC are disclosed. In the first system (a) a cool/warm water starts from the feed forward cool/warm water pipe 47, flows through the flow rate control valve 44 and then the heat exchange coil 43 of the interior unit 31 and returns to the returning pipe 46 (indicated on the left-above in FIG. 6). At that time, the controller 40 is installed in each of the rooms provided with the outlet 32, and also serves as a controller of the VAV unit 34. The operation signal is sent to the interior unit operation control panel 41 to control opening/closing of the flow rate control valve 44. The operation signal is also sent to the operation control panel 20 of the absorption cool/warm water unit system via the cross over 61 and the signal transmission line 62. In this layout, it is possible to operate the absorption cool/warm water unit system from an individual room and to provide air conditioning which suits to each of the rooms.

The second one is a system (b) in which a cool/warm water starts from the feed forward cool/warm water pipe 47, passes through the flow rate control valve 44, is supplied to a plurality of fan coil units FC connected via branching pipes and then returns to the returning cool/warm water pipe 46 (indicated on the left-middle in FIG. 6). The operation signal of each of the fan coil units FC is transmitted to the operation control panel 20 through a fan coil unit group centralized control panel 81 via the cross over 61 by a fan coil unit operation switch 108 so as to operate the absorption cool/warm water unit system. In this arrangement, it is possible to separately cope with the cooling/heating requests made from small rooms. Furthermore, in this system, since a cool/warm water is supplied, it is possible to eliminate a ventilating device which would be required in a conventional cooling/heating multiple system which employs a fluorocarbon gas to prevent an accident of suffocation due to leakage of a refrigerant. Since the total capacity of the fan coil units FC may be increased to that of the interior unit 31, by increasing the number of the fan coil units FC, an operation at an extremely small load is not necessary, and smooth operation of the absorption cool/warm water unit system is ensured.

In a third system (c) a cool/warm water starts from the feed forward cool/warm water pipe 47, passes through the flow rate control valve 44 and then the heat exchange coil 43 of the interior unit 31 and then returns to the returning pipe 46. This system has been described with reference to FIG. 1, and description thereof is therefore omitted.

In any of the aforementioned three system (a), (b), (c), since the operation signal from each of the interior units 31 or each of the fan coil units FC is sent to the operation control panel 20 of the absorption cool/warm water unit system via the cross over 61 and the signal transmission line 62, and the heat input is restricted immediately after the cooling operation has been stopped, it is possible to provide an absorption cool/warm water unit system which ensures safe and reliable operation control, which is free from crystallization of the solution and which is capable of separately coping with air conditioning requests made in individual rooms.

Figure 7:
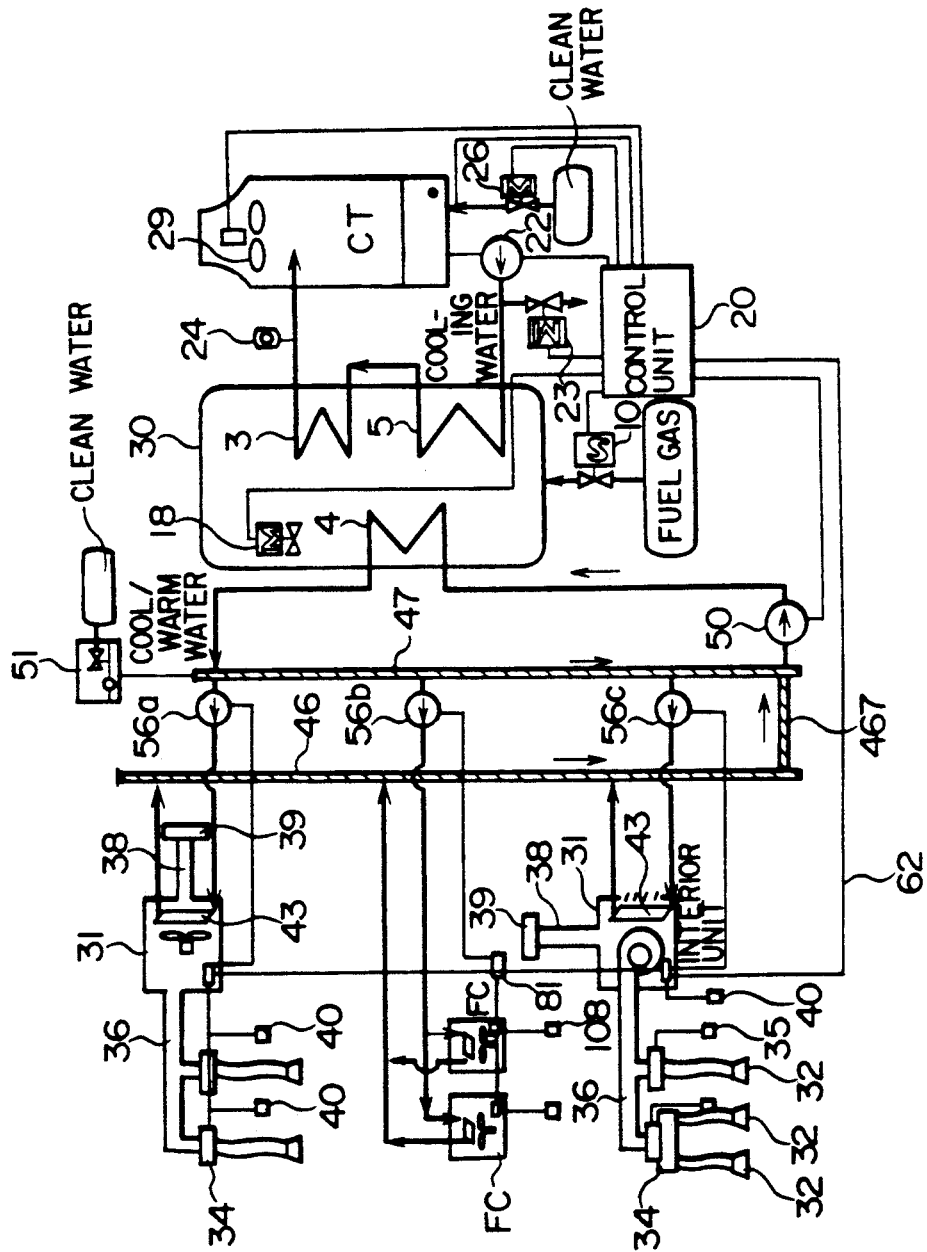
FIG. 7 is a schematic view of a fifth embodiment of the present invention.

In FIG. 7, since the embodiment employs an absorption cool/warm water unit 30 which is the same as that shown in FIG. 6, an illustration thereof is simplified. The embodiment of FIG. 7 differs from the embodiment of FIG. 1 in the following points. Namely, an end of the feed forward cool/warm water pipe 47 is connected to an end of the return cool/warm water pipe 46, and the cool/warm water branched off from the vicinity of a connecting portion 467 is sent to the evaporator 4 by the cool/warm water pump 50. The evaporator 4 is communicated with the other end of the pipe 47. Furthermore, when a plurality of secondary cool/warm water pumps 56a to 56c are not operated, the cool/warm water on which heat exchange has been subjected in the evaporator 4 passes through the feed forward cool/warm water pipe 47 and the connecting portion 467 and returns to the cool/warm water pump 50. In this arrangement, since only a resistance with which water is passed is applied to the cool/warm water pump 50, a smaller pump than that used in FIG. 1 can be employed. The secondary pumps can also be made small. Therefore, this embodiment has an excellent installation property. Furthermore, when an air conditioning request is made from one of the interior units 31, the cool/warm water can be circulated only in the corresponding system by operating the corresponding secondary cool/warm water pump (for example, 56a). Consequently, the flow rate control valve 44 for each of the interior units 31 can be omitted. Also, since the secondary cool/warm water pump corresponding to each of the air conditioning requests is operated, energy conservation can be achieved.

Figure 8:
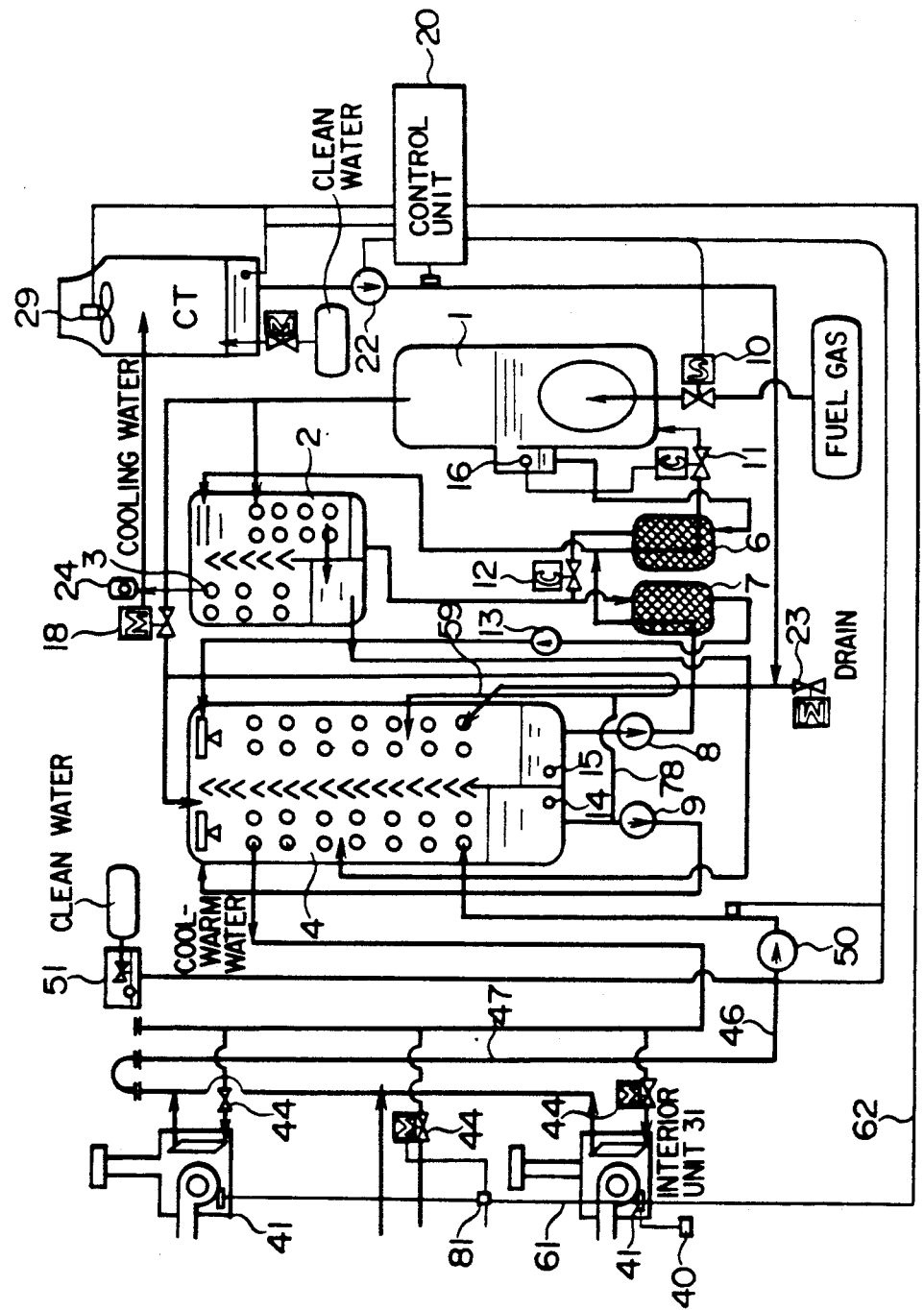
FIG. 8 is a schematic view of a sixth embodiment of the present invention.

The embodiment of FIG. 8 differs from the embodiment shown in FIG. 1 in the following points. Namely, a steam pipe which connects the cooling/heating switch-over valve 18 and the evaporator 4 branches into one portion connected to the bottom portion of a bubble pump 59 and the other portion connected to the evaporator 4. A liquid refrigerant introducing pipe 78 connected to the bottom portion of the evaporator 4 is connected to the bubble pump 59. The discharge portion of the bubble pump 59 is disposed such that the pump 59 can discharge a refrigerant liquid to the absorber 5. When a heating operation instruction is given to the control panel 20 via the signal transmission line 62, the cooling/heating switch-over valve 18 is opened and the bubble pump 59 is driven by refrigerant steam to discharge the liquid refrigerant in the liquid refrigerant tank at the bottom of the evaporator 4 into the absorber 5 together with the refrigerant steam. According to this embodiment of FIG. 8, operation of the refrigerant pump 9 during the heating operation is not necessary, and the required power of the system can be reduced. Furthermore, the fan coil unit group centralized panel 81 for controlling the plurality of fan coil units FC and the operation switches 108 thereof is provided in such a manner that it is connected to the other interior unit control panels 41 via the cross over 61. Consequently, the operation signals from the fan coil units FC are all sent to the fan coil unit group centralized control panel 81 which transmits heating/cooling selection signals and the operation signals to the cool/warm water flow rate control valve 44 from the control panel 20. In the embodiment of FIG. 8, since the fan coil unit group centralized control panel 81 for integrating the air conditioning requesting signals from the individual fan coil unit operation switches 108 is provided, it is not necessary for excessive signals to be input to the cross over 61, and the amount of signals can thus be reduced. Consequently, quick control of the entire system is available.

Figure 9:
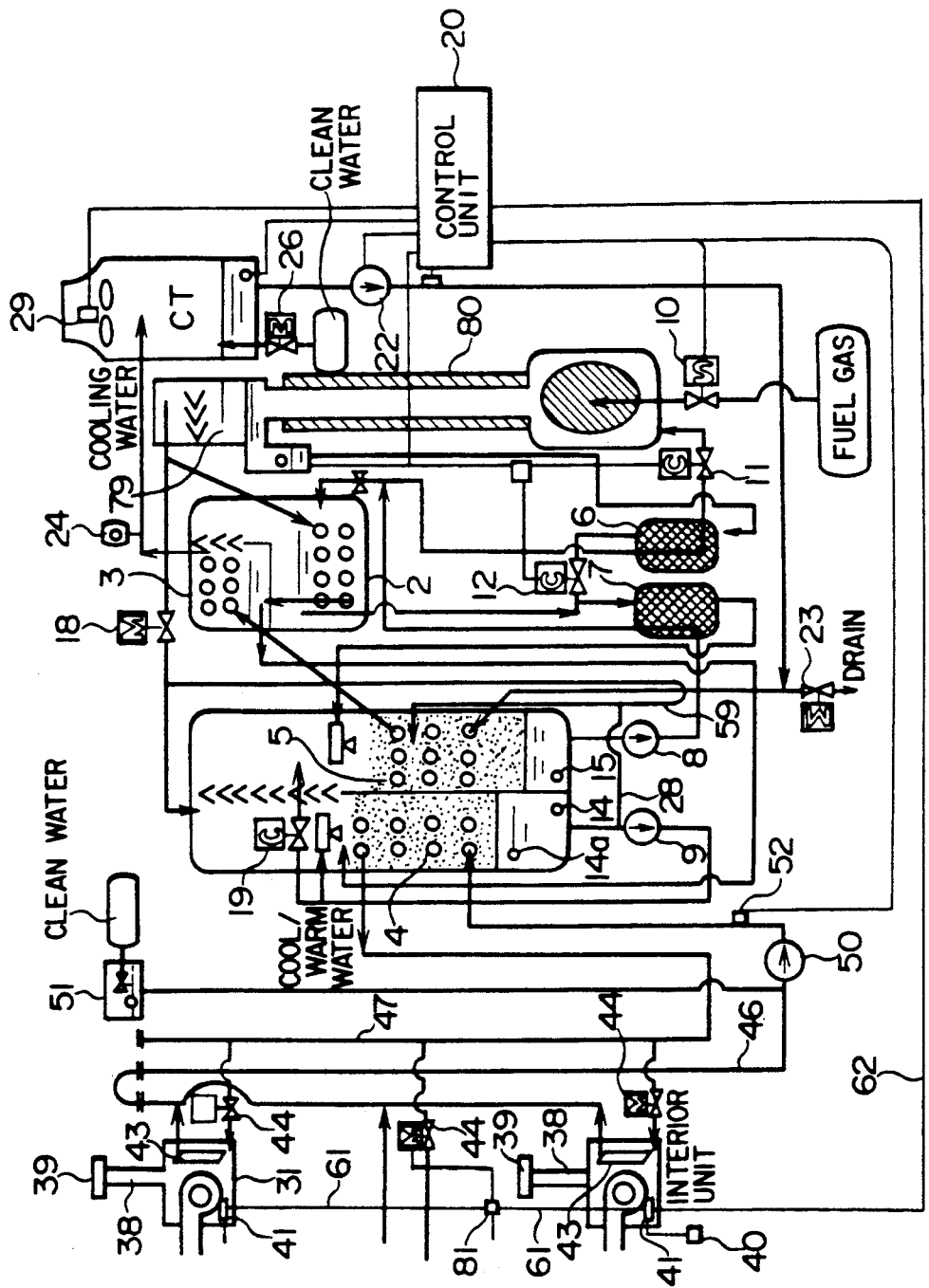
FIG. 9 is a schematic view of a seventh embodiment of the present invention.

The embodiment of FIG. 9 differs from that shown in FIG. 8 in the following points. Namely, the high-temperature regenerator 1 includes a once-through boiler type regenerator 80 and a gas-liquid separator 79. According this, the amount of solution reserved can be reduced, and an absorption cool/warm water unit having a high load responsibility can thus be provided. Furthermore, the low-temperature regenerator 2 is of a full-liquid type which contains the condenser 3 in the upper portion thereof. Since the levels of the solution in the high-temperature regenerator 1 and the low-temperature regenerator 2 can be made high, the strong solution can be circulated through the absorber 5 by virtue of the liquid head, and then the solution spraying pump 13 can be eliminated. Furthermore, a liquid refrigerant feed valve 19 is disposed for feeding the liquid refrigerant from the evaporator 4 to the absorber 5. In addition to the refrigerant level switch 14, a second liquid refrigerant level switch 14a is disposed in the liquid refrigerant tank of the evaporator 4 to prevent idling of the refrigerant pump 9. When the cooling operation is stopped, the refrigerant feed valve 19 is opened to discharge the liquid refrigerant from the evaporator 4 to the absorber 5 dilute the solution until the level of the liquid refrigerant reaches a level detected by the liquid refrigerant level switch 14a. In this manner, excessive dilution can be prevented, and the time required to start the cooling operation can be shortened. Also, in a case where the level of the liquid refrigerant is lower than the level detected by the liquid refrigerant level switch 14a when the operation is stopped, such dilution of the solution is not conducted, and the solution bypass valve 12 is opened. Consequently, the very strong solution in the high-temperature regenerator 1 can be quickly diluted by the weak solution and the diluting time can thus be reduced. The air systems in the embodiments shown in FIGS. 8 and 9 are the same as that shown in FIG. 6, illustration thereof is omitted.

Figure 10:
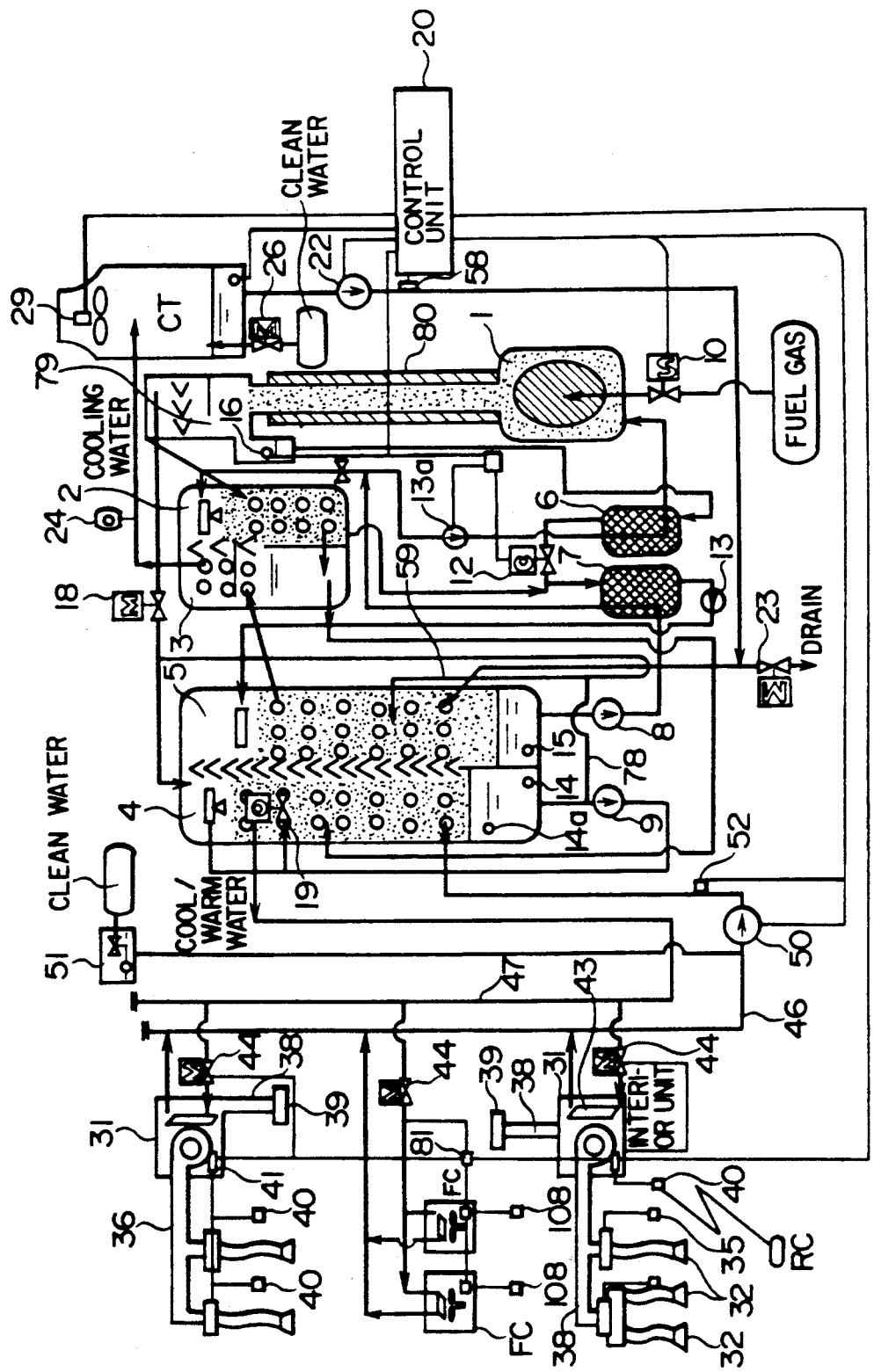
FIG. 10 is a schematic view of an eighth embodiment of the present invention.

The embodiment of FIG. 10 differs from the embodiment shown in FIG. 9 in the following points. Namely, the low-temperature regenerator 2 is of a spraying type and the interior units 31 are operated by a remote controller RC. Since the low-temperature regenerator 2 is of the spraying type, the amount of strong solution in the low-temperature regenerator 2 is small, thus reducing the heat capacity thereof. Consequently, an absorption multiple system having an excellent load responsibility can be provided. Furthermore, since the remote controller RC is used for the operation of the interior units, it is not necessary for the controller 40 to be disposed on the respective rooms, and layout of the rooms can be made free.

Figure 11:
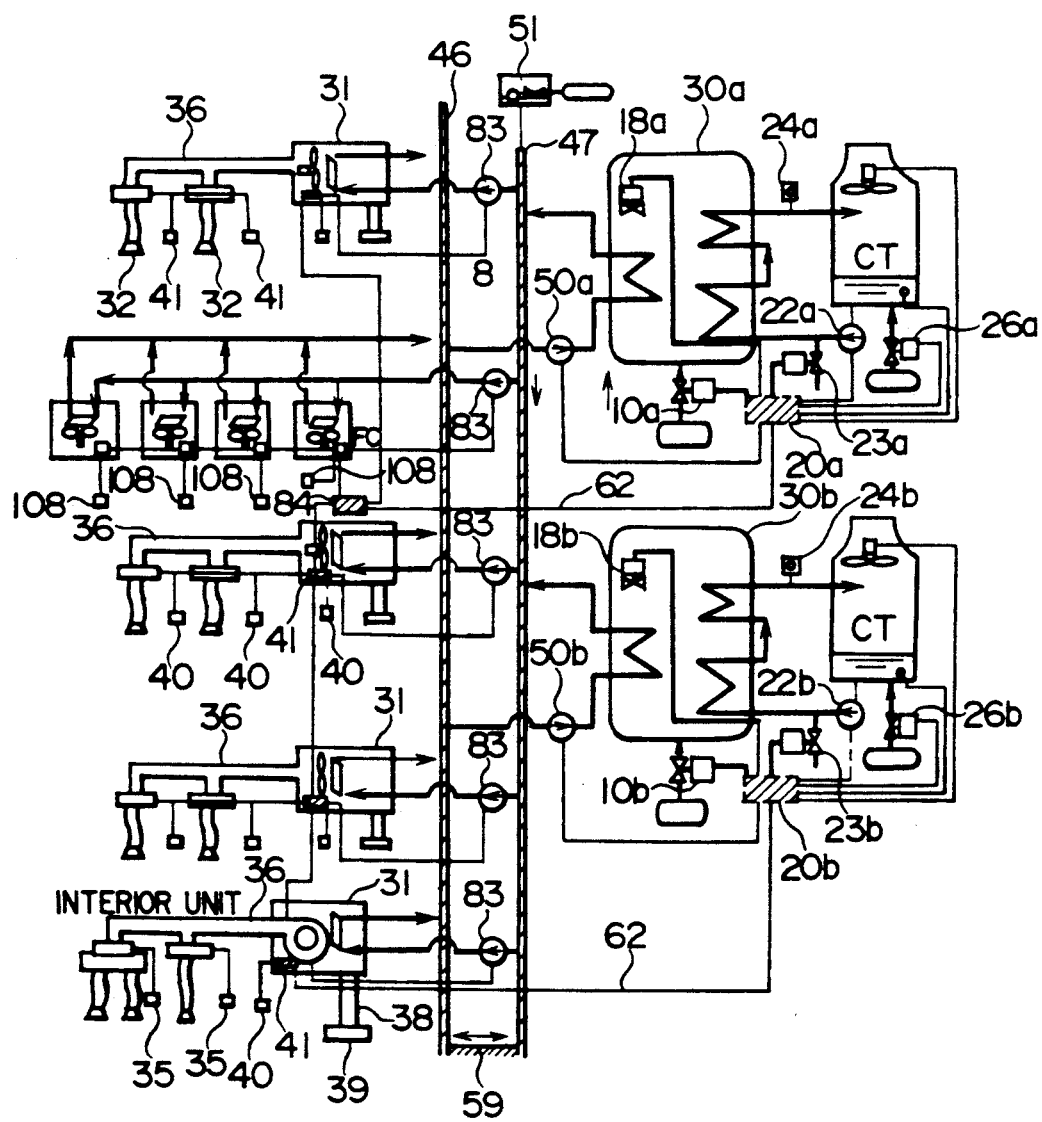
FIG. 11 is a schematic view of a ninth embodiment of the present invention.

The embodiment of FIG. 11 differs from the embodiment shown in FIG. 10 in the following points. Namely, two absorption cool/warm water units 30a and 30b are provided. Two cooling towers CTa and CTb, two cooling water pumps 22a and 22b, and cool/warm water pumps 50a and 50b are provided associated with the respective units 30a and 30b. The suction portions of the cool/warm water pumps 50a and 50b are connected to the return cool/warm water pipe 46 so as to allow the cool/warm water to flow through the absorption cool/warm water units 30a and 30b to the feed forward cool/warm water pipe 47. The feed forward cool/warm water pipe 47 is provided with a plurality of secondary cool/warm water pumps 83 and also with the interior units 31 or a plurality of fan coil units FC via the cool/warm water flow rate control valves 44, thereby returning the cool/warm water to the return cool/warm water pipe 46. The operation control panels 41 of the individual interior units 31 are connected via the cross over 61 to the fan coil unit group centralized control panel 81, which are in turn connected to a unit number control panel 84 and operation control panels 20a and 20b of the absorption cool/warm water units 30a and 30b via the signal transmission line 62. According to the embodiment of FIG. 11, it is possible to provide a large-scale air conditioning system by employing the two absorption cool/warm water units.

In the aforementioned embodiments, the parallel flow type absorption heater has been described. However, the present invention can also applied to other types of absorption apparatuses, such as series flow type or reverse flow type. In the series flow type one, the regeneration is conducted on a route of an absorber, a high-temperature regenerator, a low-temperature regenerator and an absorber. In the reverse flow type absorber, regeneration is conducted on a route of the absorber, the low-temperature regenerator, the high-temperature regenerator and the absorber. The present invention can also be applied to a system which includes a single regenerator.

What is claimed is:

1. A multiple type absorption air conditioning system comprising:

an absorption cool/warm water unit in which a weak solution diluted by a refrigerant is heated in a regenerator to generate refrigerant steam, said refrigerant steam is cooled and condensed by a cooling means and is then evaporated in an evaporator to cool a cool/warm water during a cooling operation, or a cool/warm water is heated by said refrigerant steam in said evaporator during a heating operation, the refrigerant from said evaporator is absorbed in or mixed with a strong solution produced when said refrigerant steam is generated in an absorber to said weak solution, and said weak solution is returned to said regenerator;

a cool/warm water system through which said cool/warm water cooled or heated by said absorption cool/warm water unit flows;

a plurality of water air heat exchanging means for cooling or heating air by said cool/warm water from said cool/warm water system; and an air system for blowing said air cooled or heated by said water air heat exchanging means into individual rooms.

2. A system according to claim 1, wherein said system further comprises: means for controlling an operation of said absorption cool/warm water unit in a cooling or a heating operation, stoppage thereof and switch over of said cooling and heating operations thereof by controlling pumps and valves of said absorption cool/warm water unit and of said cool/warm water system; a controller provided in each of said water air heat exchanging means, said controller having a function of operating and stopping said absorption cool/warm water unit and of selecting the operation modes of said absorption cool/warm water unit; and means for transmitting an operation signal of said controller to said operation control means to allow said absorption cool/warm water unit to be controlled by said controller.

3. A system according to claim 2, wherein said cool/warm water system includes a main cool/warm water pipe connected to said absorption cool/warm water unit, a plurality of sub cool/warm water pipes connected to said water air heat exchanging means, and branch pipes for connecting said main cool/warm water pipe to said sub cool/warm water pipes.

4. A system according to claim 2, wherein when an operation stopping signal is input from one of said controllers during the cooling operation, said operation control means stops input of heat to said regenerator for a predetermined period of time and then performs heat input again thereafter.

5. A multiple-type air conditioning system comprising:

an absorption cool/warm water unit in which a weak solution diluted by a refrigerant is heated in a regenerator to generate refrigerant steam, said refrigerant stem is cooled an condensed by a cooling means and is then evaporated in an evaporator to cool a cool/warm water during a cooling operation, or a cool/warm water is heated by said refrigerant steam in said evaporator during a heating operation, the refrigerant from said evaporator is absorbed in or mixed with a strong solution produced when said refrigerant steam is generated in an absorber to said weak solution, and said weak solution is returned to said regenerator;

a cool/warm water system through which said cool/warm water cooled or heated by said absorption cool/warm water unit flows;

a plurality of water air heat exchanging means for cooling or heating air by said cool/warm water from said cool/warm water system;

an air system for blowing said air cooled or heated by said water heat exchanging means into individual rooms;

means for controlling an operation or a heating absorption cool/warm water unit in a cooling or a heating operation, stoppage thereof and switchover of said cooling and heating operations thereof by controlling pumps and valves of said absorption cool/warm water unit and of said cool/warm water system;

a controller provided in each of said water air heat exchanging means, said controller having a function of operation and stopping said absorption cool/warm water unit and of selecting the operation modes of said absorption cool/warm water unit; and means for transmitting an operation signal of said controller to said operation control means to allow said absorption cool/warm water unit is to be controlled by said controller, wherein when operation modes of all of said controllers are set in either the cooilng or heating mode while said absoprtion cool/warm water unit is set in the same operation mode and the operation thereof is at a stop, when operations of setting an operation mode different form the set mode are conducted a plurality of times from one of the controllers, said operation control means changes over all of the settings and display of said controllers to said set operation mode, and changes over the operation mode of said absorption cool/warm water unit to said set operation mode.

6. A system according to claim 5, wherein while the operation mode of said absorption cool/warm water unit is being switched over by the plurality of operations of the controller, a display indicating that the operation mode of the air conditioning system is being changed over is performed in each of said controllers.

7. A system according to claim 5, wherein, when the operation mode of said absorption cool/warm water unit is changed over from the cooling mode to the heating mode by the plurality of operations of the controller, said operation control means performs heat input to said regenerator, drives a solution circulating pump for feeding a weak solution generated in an absorber to said regenerator, and drives a cool/warm water pump for circulating the cool/warm water in said cool/warm water system while the operation mode is being changed over.

8. A system according to claim 5, wherein, when the operation mode of said absorption cool/warm water unit is changed over from the heating mode to the cooling mode by the plurality of operations of the controller, said operation control means suspends the heat input to said regenerator and the drive of said solution circulating pump until charging of a cooling water to said cooling means is completed.

9. A system according to claim 2, wherein at least one room thermostat is provided in the room for controlling an amount of air blown from said air system, and wherein means for detecting a blowing pressure at an air outlet is provided so that the blowing pressure can be controlled such that it is constant.

10. A system according to claim 2, wherein said controller performs on/off control of blowing of air from said air system and opening/closing control of a valve provided in a route through which the cool/warm water flows from said cool/warm water system to said water air heat exchanging means.

11. A multiple-type air conditioning system comprising:

an absorption cool/warm water unit in which a weak solution diluted by a refrigerant is heated in a regenerator to generate refrigerant steam, said refrigerant steam is cooled and condensed by a cooling means and is then evaporated in an evaporator to cool a cool/warm water during a cooling operation, or a cool/warm water is heated by said refrigerant steam in said evaporator during a heating operation, the refrigerant from said evaporator is absorbed in or mixed with a strong solution produced when said refrigerant steam is generated in an absorber to said weak solution, and said weak solution is returned to said regenerator;

c cool/warm water system through which said cool/warm water cooled or heated by said absorption cool/warm water unit flows;

a plurality of water air heat exchanging means for cooling or heating air by said cool/warm water from said cool/warm water system;

an air system for blowing said air cooled or heated by said water air heat exchanging means into individual rooms;

means for controlling an operation of said absorption cool/warm water unit in a cooling or a heating operation, stoppage thereof and switchover of said cooling and heating operations thereof by controlling pumps and valves of said absorption cool/warm water unit and of said cool/warm water system;

a controller provided in each of said water air heat exchanging means, said controller having a function of operating and stopping said absorption cool/warm water unit and of selecting the operation modes of said absorption cool/warm water unit; and means for transmitting an operation signal of said controller to said operation control means to allow said controller, wherein said regenerator includes a high-temperature regenerator and a low-temperature regenerator, strong solution produced by heating a weak solution in said high-temperature regenerator emits a heat in a high-temperature heat exchanger and a low-temperature heat exchanger providing for heat exchanging, and is then led to said absorber, the weak solution produced in said absorber is heated by the emitted heat in said low-temperature heat exchanger and said high-temperature heat exchanger and is then returned to said high-temperature regenerator, and part of the weak solution which is fed out of said low temperature heat exchanger is concentrated by the refrigerant steam generated by said high-temperature regenerator in said low-temperature heat exchanger together with the strong solution which is fed out of said high-temperature heat exchanger.

12. A system according to claim 11, wherein an entire amount of the strong solution from said high-temperature heat exchanger flows through said low-temperature regenerator for concentration into said low-temperature heat exchanger.

13. A system according to claim 11, wherein an entire amount of the weak solution from said low-temperature heat exchanger flows into said low-temperature regenerator, and a part of the strong solution concentrated in said regenerator flows into said high-temperature regenerator through said high-temperature heat exchanger while the remaining part of the strong solution flows into said low-temperature heat exchanger together with the strong solution from said high-temperature heat exchanger and then flows to said absorber.

14. A system according to claim 2, wherein said absorption cool/warm water unit includes a bubble pump which is constructed by branching a part of the refrigerant steam to be fed to said evaporator during the heating operation branches to constitute a lift pumping, and wherein the liquid refrigerant on which heat exchange has been conducted between the liquid refrigerant and the cool/warm water in said evaporator is fed to said absorber by said pump.

15. A system according to claim 2, wherein said cool/warm water system has a feed forward cool/warm water pipe through which the cool/warm water flows from said evaporator to each of said water air heat exchanging means, and a return cool/warm water pipe through which the cool/warm water is returned from each of said water air heat changing means to said evaporator, and wherein a bypass valve is further provided between said feed forward cool/warm water pipe and said return cool/warm water pipe, said bypass valve being controlled such that the flow rate of the cool/warm water in said evaporator does not change when the flow rate of the cool/warm water to said water air heat exchanging means varies.

16. A system according to claim 2, wherein said cool/warm water system has a feed forward cool/warm water pipe through which the cool/warm water flows from said evaporator to each of said water air heat exchanging means, and a return cool/warm water pipe through which the cool/warm water is returned from each of said water air heat exchanging means to said evaporator, and wherein a buffer tank is further provided between said feed forward cool/warm water pipe and said return cool/warm water pipe and said evaporator, and a pump is provided on both a route which extends from said buffer tank to said feed forward cool/warm water pipe and on a route which extends from said buffer tank to said evaporator.

17. A multiple-type air conditioning system comprising:
an absorption cool/warm water unit in which a weak solution diluted by a refrigerant is heated in a regenerator to generate refrigerant steam, said refrigerant steam is cooled and condensed by a cooling means and is then evaporated in an evaporator to cool a cool/warm water during a cooling operation, or a cool/warm water is heated by said refrigerant steam in said evaporator during a heating operation, the refrigerant from said evaporator is absorbed in or mixed with a strong solution produced when said refrigerant steam is generated in an absorber to said weak solution, and said weak solution is returned to said regenerator;
a cool/warm water system through which said cool/warm water cooled or heated by said absorption cool/warm water unit flows;
a plurality of water air heat exchanging means for cooling or heating air by said cool/warm water from said cool/warm water system;
an air system for flowing said air cooled or heated by said water air heat exchanging means into individual rooms;
means for controlling an operation of said absorption cool/warm water unit in a cooling or a heating operation, stoppage thereof and switchover of said cooling and heating operations thereof by controlling pumps and valves of said absorption cool/warm water unit and of said cool/warm water system;
a controller provided in each of said water air heat exchanging means, said controller having a function of operating and stopping said absorption cool/warm water unit and of selecting the operation modes of said absorption cool/warm water unit; and
means for transmitting an operation signal of said controller to said operation control means to allow said absorption cool/warm water unit to be controlled by said controller,
wherein said cool/warm water system has a feed forward cool/warm water pipe through which the cool/warm water flows from said evaporator to each of said water air heat exchanging means, and a return cool/warm water is returned from each of said water air heat exchanging means to said evaporator, and
wherein an end of said feed forward cool/warm water pipe is connected to an end of said return cool/warm water pipe, the cool/warm water is returned to said evaporator by a cool/warm water pump provided near a connecting point between said feed forward cool/warm water pipe and said return cool/warm water, and the flow rates of the cool/warm water from said feed pipe forward cool/warm water pipe to each of said water air heat exchangers is controlled by the respective pumps.

18. A system according to claim 2, wherein in said air system including a plurality of air flow rate control means and corresponding air outlets, an operation means of said controller is provided for each of said air flow rate control means.

19. A system according to claim 2, wherein said water air heat exchanging means and the air system connected to said means are constituted by at least one fan coil unit, and wherein said controller includes an operation means provided in each of said fan coil units, and a centralized control means for gathering the outputs of the operation means corresponding to said fan coil unit and for performing control of said fan coil unit and communication between said fan coil unit and said operation control means.

20. A multiple-type air conditioning system comprising:
an absorption cool/warm water unit in which a weak solution diluted by a refrigerant is heated in a regenerator to generate refrigerant steam, said refrigerant steam is cooled and condensed by a cooling means and is then evaporated in an evaporator to cool a cool/warm water during a cooling operation, or a cool/warm water is heated by said refrigerant steam in said evaporator during a heating operation, the refrigerant from said evaporator is absorbed in or mixed with a strong solution produced when said refrigerant steam is generated in an absorber to said weak solution, and said weak solution is returned to said generator;

a cool/warm water system through which said cool/warm water cooled or heated by said absorption cool/warm water unit flows;

a plurality of water air heat exchanging means for cooling or heating air by said cool/warm water from said cool/warm water system;

an air system for blowing said air cooled or heated by said water air heat exchanging means into individual rooms;

means for controlling an operation of said absorption cool/warm water unit in a cooling or a heating operation, stoppage thereof and switchover of said cooling and heating operations thereof by controlling pumps and valves of said absorption cool/warm water unit and of said cool/warm water system;

a controller provided in each of said water air heat exchanging means, said controller having a function of operating and stopping said absorption cool/warm water unit and of selecting the operation modes of said absorption cool/warm water unit; and means for transmitting an operation signal of said controller to said operation control means to allow said absorption cool/warm water unit to be controlled by said controller, wherein said system further includes a plurality of absorption cool/warm water units each of which has the operation controlling means, and a unit number control means for gathering operation signals from said controllers and for determining the number of absorption cool/warm water units to be operated, and only the absorption cool/warm water units to which the operation signal is outputted from said unit number control means through signal transmission means are operated.

* * * * *